Patented Mar. 28, 1950

2,502,244

UNITED STATES PATENT OFFICE 2,502,244

SOIL FUMIGANT COMPRISING 1,3-DICHLOROPROPENE AND 1,2-DICHLOROPROPANE

Walter Carter, Honolulu, Territory of Hawaii, dedicated to the People of the United States of America No Drawing. Application March 26, 1943, Serial No. 480,698

5 Claims. (Cl. 167—22)

The present invention relates to methods of and means for fumigating soil, and more particularly to a fumigant method of applying the fumigant to agricultural soils and to fumigants therefor.

Although it has been heretofore proposed to incorporate various chemicals in the soil for fumigating purposes, they have been found to have only very limited use, because they have either proved altogether ineffective against many deleterious organisms, or are so costly as to prohibit their use.

It is well known that agricultural soils have a vast number of organisms, most of them minute and including among them bacteria, fungi, insects and other living organisms. This complex of living organisms, hereinafter referred to as the "biological complex," is of the greatest importance to plant growth, for it is essential that the balance between the species comprising this complex be maintained in a manner favorable to plant growth, for otherwise the deleterious species in the complex become dominant. In order to serve this useful purpose, therefore, a soil fumigant should destroy all, or a large proportion of the deleterious organisms in the soil, so that the latter may dominate the biological complex and prevent or retard the re-establishment of the deleterious organisms to a predominant or harmful degree.

It is accordingly the major object of my invention to provide novel methods of and means for fumigating soil, which will eliminate or very materially reduce populations of deleterious organisms such as, for example, Nematodes, insects and fungi, and yet which will not injure growing plants.

Another important object is to provide a method of modifying the biological complex of the soil by a soil fumigant in a favorable manner which, while eliminating the deleterious organisms in the soil, permits the beneficial organisms to increase and maintain a favorable balance in the biological complex.

A further object is to provide novel soil fumigants, which are easily applied to the soil, are comparatively inexpensive when measured by the improvement in plant growth achieved, and which will effectively destroy all or a large proportion of the deleterious organisms in the soil without exerting any harmful effects upon plant life.

Further objects will become apparent as the specification proceeds, and from the appended claims.

The novel fumigant of the invention is a mixture of 1-3 dichloropropene and 1-2 dichloropropane, preferably in commercially obtainable form (i. e. not C. P.) having the following properties:

|  | 1,3-Dichloropropene, Boiling isomer | | 1,2-Dichloropropane |
|---|---|---|---|
|  | Low | High |  |
| Empirical formula | $C_3H_4Cl_2$ | | $C_3H_6Cl_2$ |
| Structural formula | $CHCl=CH-CH_2Cl$ | | $CH_2Cl-CHCl-CH_3$ |
| Boiling-point, C | 104.1 | 112.1 | 96.2 |
| Density 20/4 C | 1.225 | 1.226 | 1.156 |
| Refractive Index 20/D | 1.469 | 1.475 | 1.439 |
| Heat of vaporization B. t. u./lb. (calc.) | 131 | | |

I have found that if a mixture of 1-3 dichloropropene and 1-2 dichloropropane is injected into the soil prior to planting, Nematodes (*Heteroda marioni*), insects, such as the larvae of *Anomala orientalis*, and *Adoretus sinicus*, and pythiaceous fungi are either eliminated or greatly reduced in numbers, and the plant growth is greatly improved, the roots of the plant are extremely extensive as compared to plants growing in untreated soil, and in the case of the pineapple, the plants are larger and the ratoon sucker growth, upon which the second growth depends, is much more vigorous and stronger.

The novel fumigant may be used either in its commercial form or may be first emulsified. For example 100 cc. of water are mixed with 5 gms. of bentonite and to this is added 60 cc. of the 1-3 dichloropropene and 1-2 dichloropropane mixture, to which has been added 40 cc. of a light Diesel oil, preferably about 27 plus in gravity. The mixture is then emulsified and results in a homogeneous, stable product, which can be diluted to any desired degree.

Although the proportions of the two compounds in the mixture obtained by me are in the neighborhood of 50% of each, it is to be understood that the invention is not limited to this proportion, the latter being preferred and is employed for the chief reason that it occurs in this ratio in commercially available quantities essentially as a by-product, and hence is of comparatively low cost. However, a mixture in which 1,2-dichloropropane makes up as much as 90% of the total, and 1,3-dichloropropene 10% can be employed.

It has also been discovered that certain impurities may be present in the fumigant without materially impairing the effectiveness of the method of the invention, even though they may range as high as 30 per cent of the total volume of the mixture as manufactured.

I have found that the method of application of the fumigant to the soil can be carried out in several different ways, the particular method being selected to suit the particular condition which it is desired to treat. For example, in pineapple soils, in which I have carried out extensive experiments, the material can be injected either before the paper mulch is laid, or can be injected through the paper mulch by means of a special injector. If it is desired to fumigate the soil around living plants, then the material can be injected into the soil a short distance from the plant, either in its commercial form, or emulsified in the manner previously described.

I have found that the preferred dosages of the fumigant of the invention, when injected in the soil as just described, will usually range from 100 to 300 pounds per acre, but the particular dosage necessary to achieve effective results will depend upon the local conditions and the particular crop involved, and may vary from one to one thousand pounds per acre.

When pineapple soils in the Hawaiian Islands in several locations differing in respect to soil type, temperature, and rainfall were treated in accordance with the invention, it was found that although there was no distinct difference in growth for the first 12 or 15 months after planting, from that time on, the plants growing in the treated soil began to show a progressive improvement over exactly similar plants growing in untreated adjoining plots of soil for check purposes, so that at the end of 20 to 24 months, the treated plots were greatly superior in growth to those in the untreated plots.

The extent of the difference between the treated plots and the checks varied with the locations, the greatest difference being in a relatively dry area where Nematodes, Anomala beetle larvae and pythiaceous fungi are known to cause serious plant failure by their combined action. In other locations where the difference was real but not so pronounced, Nematodes were known to be present; Anomala beetle larvae were not, they being replaced in the complex by the larvae of *Adoretus sinicus*. The fungi species also differed in these wetter, cooler areas, and symphylids are normally more numerous in the wetter, cooler sections.

It is clearly apparent from these results attained by practising the method of the invention in these widely separated localities that the biological complex in each locality had been modified in such a manner as to gradually permit the plants to improve in every respect. The root systems of the treated plants are extremely extensive as compared with the plants of the untreated plots, and the plants are larger and the ratoon sucker growth, upon which the second crop depends, is much more vigorous and stronger, even in the area where the effect of the treatment was least obvious.

Changes in the soil complex may be brought about in different ways by different soil fumigants. In other words, the interrelations between organisms in the biological complex are so complicated that one fumigant may affect the biological complex in one manner, and another fumigant may affect it in another manner. While some fumigants of the prior art affect the complex in such a manner that pineapple plants show a dark green growth very soon after beginning their growth, this is not always true of plants in soil treated with the 1-3 dichloropropene and 1-2 dichloropropane mixture of the invention, and yet the end result, as measured by plant growth and vigor and resistance to late development of deleterious organisms, is much superior to that attained by plants grown in soil treated with the fumigants of the prior art.

In other experiments, garden soil heavily infested with Nematodes (*H. marioni*), was treated by injecting the 1-3 dichloropropene and 1-2 dichloropropane mixture into the soil prior to planting, and the results showed that for all practical purposes, a complete control of the Nematodes had been achieved. In these cases the crops used were such rapidly maturing varieties that a long-term effect on the soil complex could not be measured. With crops like garden beets and carrots for example, untreated crops produced no commercial yield and the roots of the plants were very heavily infested with *H. marioni*. On the other hand, the treated plots showed good commercial yields with only very rare cases of galling, and the latter were insignificant in size and of no apparent economic importance.

Nursery stock growing in soil in cans can be successfully treated in accordance with the invention so that Anomala larvae, such as those of *Anomala orientalis*, can be killed and the plant safely moved to areas which are free of the Anomala, and from which it is desired to exclude the insect. The use of the fumigant of the invention as an insecticide is not limited to soil-inhabiting insects for I have found that insects infesting stored food products such as rice and seeds, can be destroyed quickly and effectively by the use of the 1-3 dichloropropene and 1-2 dichloropropane mixture, used as a fumigant.

From the foregoing detailed disclosure it is apparent that the invention provides a novel method of and means for fumigating soil, which eliminates or very materially reduces populations of deleterious organisms in the soil such as Nematodes, insects and fungi, and favorably modifies the biological complex, and yet is comparatively inexpensive and readily applied to the soil, and is not injurious to growing plants.

What is claimed is:

1. The method of ridding insect infested media of insects and other deleterious organisms, which comprises treating said media with a composition comprising from about 10 to 50 per cent of 1,3-dichloropropene in admixture with from about 90 to 50 per cent of 1,2-dichloropropane in quantities substantially sufficient to exterminate said organisms.

2. The process of claim 1 wherein said composition is applied in the form of an aqueous emulsion.

3. The method of ridding agricultural soils of deleterious organisms, which comprises treating the soil with a composition comprising from about 10 to 50 per cent of 1,3-dichloropropene in admixture with from about 90 to 50 per cent of 1,2-dichloropropane, in an amount of from 100 to 300 pounds per acre to reduce the populations of deleterious organisms sufficiently to produce at least a balance favorable to plant growth between the deleterious organisms and the beneficial organisms comprising the biological complex of said soils.

4. An insecticidal composition comprising an aqueous emulsion containing a mixture of from about 10 to 50 per cent 1,3-dichloropropene and 90 to 50 per cent of 1,2-dichloropropane emulsified with bentonite and a light Diesel oil.

5. The method of fumigating soil comprising treating the soil with a composition comprising 1,3-dichloropropene and 1,2-dichloropropane in substantially equal proportions.

WALTER CARTER.

REFERENCES CITED

The following references are of record in the file of this patent:

UNITED STATES PATENTS

| Number | Name | Date |
| --- | --- | --- |
| 1,646,149 | Jones | Oct. 18, 1927 |
| 2,057,044 | Meisenburg | Oct. 13, 1936 |
| 2,130,084 | Groll et al. | Sept. 13, 1938 |

OTHER REFERENCES

Carter, Science, April 23, 1943, pages 383, 384.

Technical Bulletin, No. 162, Mar. 1929, U. S. Dept. of Agric., page 9.

Hutson, Jr., of Economic Entomology, Feb. 1933, page 291.